United States Patent [19]

Thompson

[11] Patent Number: 4,606,587

[45] Date of Patent: Aug. 19, 1986

[54] PRECISION AIR SLIDE

[75] Inventor: Vern C. Thompson, Minneapolis, Minn.

[73] Assignee: Automated Quality Technologies, Inc., Minneapolis, Minn.

[21] Appl. No.: 690,462

[22] Filed: Jan. 8, 1985

[51] Int. Cl.$^4$ ............................................. F16C 32/06
[52] U.S. Cl. ........................................ 384/12; 74/110; 74/590
[58] Field of Search ...................... 308/5 R, 3 A, 244; 74/590, 110, 589

[56] References Cited

U.S. PATENT DOCUMENTS

| | | | |
|---|---|---|---|
| 1,391,886 | 9/1921 | Fritz | 308/244 |
| 3,053,583 | 9/1962 | Shaw . | |
| 3,272,568 | 9/1966 | Koorneef et al. | 308/5 |
| 3,325,229 | 6/1967 | Webb | 308/5 |
| 3,368,850 | 2/1968 | Wilcox | 308/5 |
| 3,422,688 | 1/1969 | Bruderer | 74/590 |
| 3,447,840 | 6/1969 | Gress, Jr. | 308/5 |
| 3,447,841 | 6/1969 | Fernlund . | |
| 3,449,023 | 6/1969 | Sperman | 308/5 |
| 3,475,065 | 10/1969 | Weichsel | 308/5 |
| 3,578,827 | 5/1971 | Smith | 308/5 |
| 3,603,652 | 9/1971 | Youden | 308/5 |
| 3,679,272 | 7/1972 | Costa et al. . | |
| 4,035,037 | 7/1977 | Cunningham | 308/5 R |
| 4,368,930 | 1/1983 | Duchaine | 308/5 R |
| 4,448,460 | 5/1984 | Yamamoto | 308/5 R |

OTHER PUBLICATIONS

Dover Air Bearings, Dover Instrument Corp., Bulletin No. 274.
Air Bearing Gaging Modules for Linear Geometry, Pheumo Precision, Inc.
Pneumo-Guide Air Bearing Slides: Horizontal Air Slides (HAS) Series, Pheumo Precision, Inc., pp. 2-7.
Thomas Register 1984, vol. 1, pp. 834-839.

Primary Examiner—Lenard A. Footland
Attorney, Agent, or Firm—Kinney & Lange

[57] ABSTRACT

A gas bearing air slide assembly includes a slide ram movable within a relatively stationary housing. The slide ram and housing have a plurality of mated planar slide surfaces. Pressurized air is supplied between the mated slide surfaces of the slide ram and housing to create a hydrostatic bearing separating said mated surfaces and supporting the slide ram for longitudinal movement with respect to the housing. A counterbalance is provided on the slide ram for movement in direction opposite that of slide ram movement to compensate for slide ram axial displacement as it is extended from the housing. The housing is formed from a pair of identical housing halves joined along a joinder plane which passes through a central longitudinal axis of the slide ram. The slide surfaces of the ram and housing are mated by equalized lapping to a point of zero tolerance. Spacer shims are positioned along the joinder plane between the housing halves when assembled to provide sufficient tolerance between the mated slide surfaces to permit movement of the slide ram with respect to the housing.

20 Claims, 5 Drawing Figures

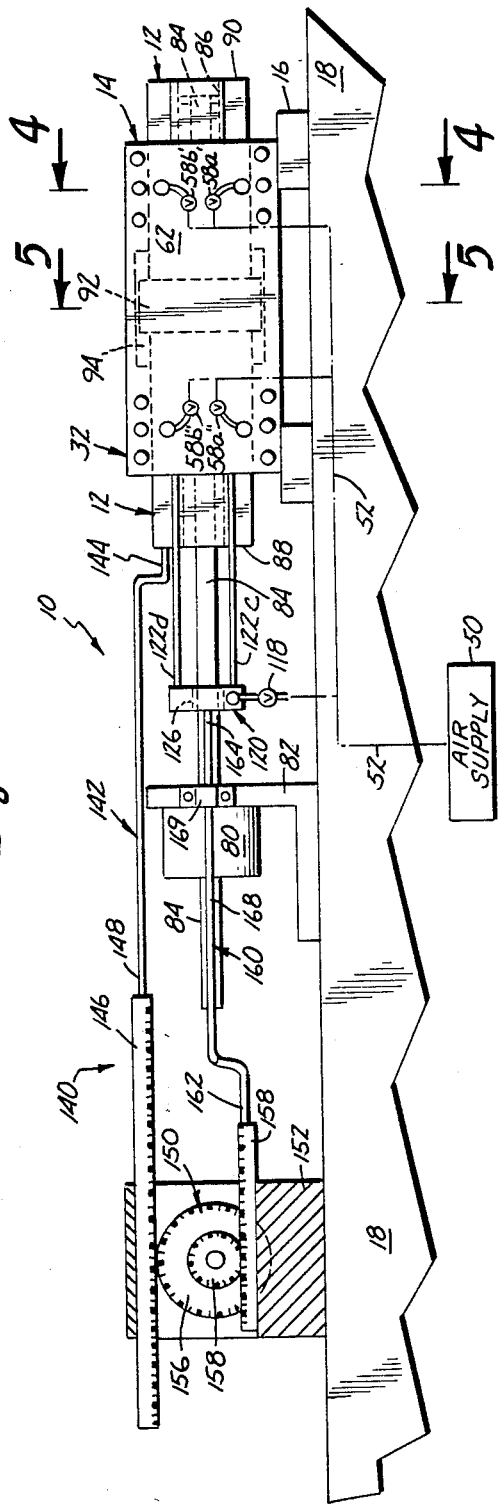
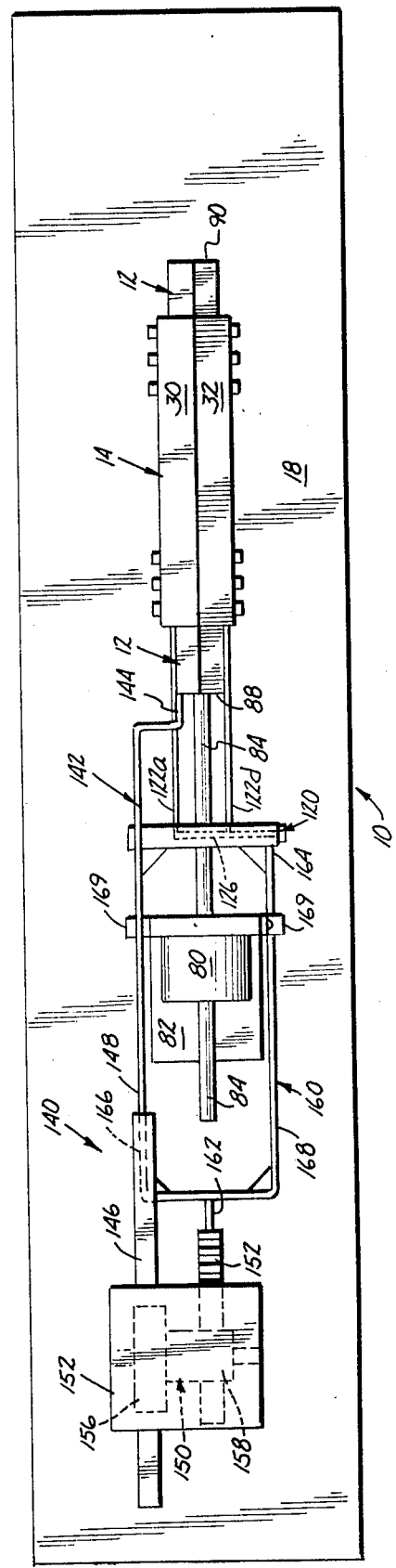

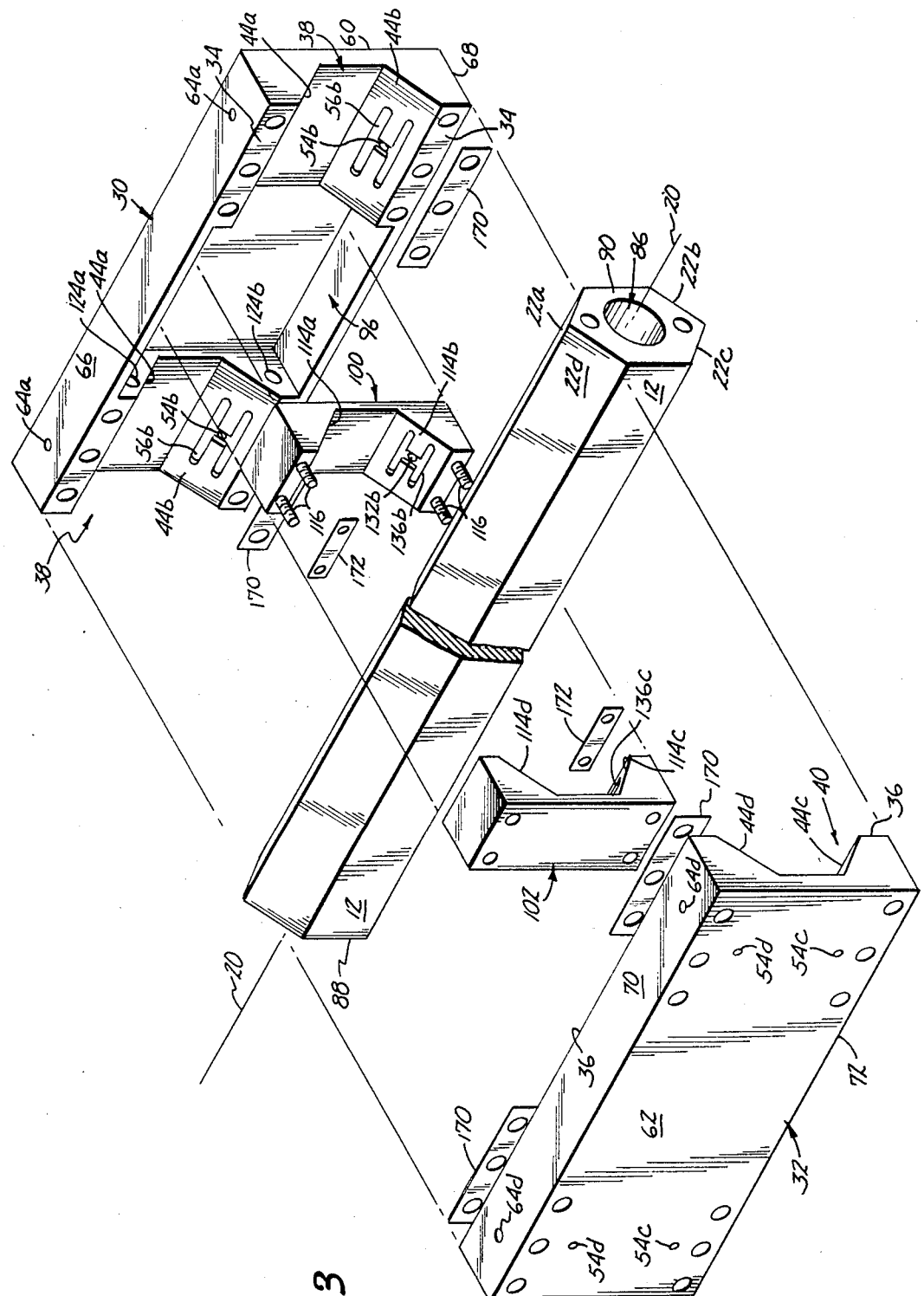

PRECISION AIR SLIDE

BACKGROUND OF THE INVENTION

1. Field of the Invention

The present invention relates to gas bearings, and more specifically to a gas bearing assembly wherein an inner ram is supported by a plurality of opposed gas bearings from an outer housing for linear movement relative to the housing.

2. Description of the Prior Art

Gas bearings are often used when precise movement of a component is desired, or when motion vibrations must be kept to a minimum. The gas usually used for such bearings is compressed air. Prior art air bearing linear slides have typically taken the form of a base beam upon which a saddle rides, with an air bearing being created therebetween to support the saddle upon and about the beam. Air bearing linear slides of this type are illustrated by those manufactured by Professional Instruments Company of Minneapolis, Minn., Dover Instrument Corp. of Westboro, Mass. and Pneumo Precision, Inc. of Keene, N.H. Such a linear air bearing slide is also shown in U.S. Pat. No. 4,448,460, granted to Yamamoto on May 15, 1984.

This type of linear air bearing slide presents some disadvantages for various applications. For example, the extent of movement of the saddle is limited by having to have a beam directly underneath it. In addition, such linear slides are typically only useful for horizontal applications. If a precise location probe is to be mounted on the saddle, the chance for error location increases as the probe is moved laterally further from the precise sliding and support surfaces of the beam. Pressurized air is usually fed to the saddle portion of such units, and thus movement of the saddle requires that air hoses must follow it to provide air any may bias such movement.

U.S. Pat. No. 3,578,827, granted to Smith on May 18, 1971 does show an air bearing arrangement wherein the beam is movable rather than a saddle. In this case, the pressurized air bearings are supported on a stationary frame. The arrangement shown in Smith, however, does not address many of the problems and concerns mentioned above. In addition, when the beam is moved relative to a stationary frame, it can be extended some distance from the frame. This can cause the beam to droop relative to the housing and a desired axis and thus create errors in precise position location proximate the end of the beam. Some means to counteract such drooping of extended beams in a linear air bearing is thus required in order to maintain precise position location functions.

The manufacture of precision gas bearings in general also presents problems. For gas bearings to be useful for precise position location, a high repeatablity is desired for the movable element (either saddle or beam) when it is moved and then returned to its original location. Such precision is dependent not only on the means used for moving the movable element (e.g., motor, actuator, etc.), but also on the precise mating of the relative sliding surfaces of the movable element and the stationary element. Several United States patents are illustrative of attempts to address these concerns. U.S. Pat. No. 3,578,827, granted to Smith on May 18, 1971 shows the use of springs to load one opposed parallel bearing surface against a precise "home" surface on a beam. U.S. Pat. No. 3,447,840, granted to Gress, Jr. on June 3, 1969 shows the use of a plate of glass as one of the bearing surfaces in an effort to obtain uniform support and location. U.S. Pat. No. 3,272,568, granted to Koorneef et al. on Sept. 13, 1966 introduces the use of magnets to urge the bearing surfaces of the relative movable members together across an air cushion and thereby pre-stress those surfaces to maintain a gas cushion of constant thickness between them.

SUMMARY OF THE INVENTION

The present invention is a gas bearing slide assembly for controlled linear motion and a method for producing same. The slide assembly of the present invention overcomes many of the disadvantages of prior art air bearing linear slides. More precise position location is possible with the present slide assembly, it is more versatile than prior art linear slides in function and design and is of quite simple manufacture, while achieving greater precision and mating of the relative sliding surfaces.

The gas bearing slide assembly for controlled linear motion of the present invention includes an elongated slide ram which has a central longitudinal axis. The exterior of the slide ram is partially defined by a plurality of symmetrically opposed planar and longitudinally extending ram slide surfaces. The slide assembly also includes a first housing half which has a recess extending longitudinally along an inner side thereof, with said recess being defined by a first set of planar and longitudinally extending housing slide surfaces. A second housing half is mounted with respect to the first housing half and also has a recess extending longitudinally along an inner side thereof, with said recess being defined by a second set of planar and longitudinally extending housing slide surfaces. When the housing halves are joined together along their inner sides, the recesses of the first and second housing halves combine to form a longitudinal throughbore between the two housing halves. The slide ram is axially slidably receivable in said throughbore with the ram slide surfaces and housing slide surfaces being in closely spaced slidable mated alignment to permit longitudinal movement of the slide ram relative to the housing halves. Pressurized gas is supplied between the ram slide surfaces and the housing slide surfaces to form hydrostatic support films or bearings between said mated surfaces so that the slide ram is suspended from the housing slide surfaces.

The first and second housing halves are joined together along a joinder plane which passes through the central axis of the slide ram. A plurality of spacer shims are secured between the housing halves along the joinder plane to vary the size of the throughbore in direction perpendicular to the joinder plane until a desired clearance is obtained between the mated slide surfaces. In a preferred embodiment, counterbalance means are longitudinally movably mounted on the slide ram, and means are provided for moving the counterbalance means in direction opposite to the direction of longitudinal movement of the slide ram.

In making the slide assembly of the present invention, the slide ram and housing halves are formed as described above. Precise mating of each pair of mating slide surfaces on the slide ram and housing is achieved by equalizing lapping of said surfaces together. Such lapping is done to the extent that if spacer shims were not placed between the housing halves when assembled, the slide ram would not be slidably movable within the throughbore.

BRIEF DESCRIPTION OF THE DRAWINGS

FIG. 1 is a side elevational view of the gas bearing slide assembly for controlled linear motion of the present invention, with some parts broken away and shown in section.

FIG. 2 is a top plan view of the slide assembly.

FIG. 3 is an exploded pictorial perspective view of those components of the slide assembly supported and separated by the gas bearings.

DETAILED DESCRIPTION OF THE PREFERRED EMBODIMENTS

Figure 5:
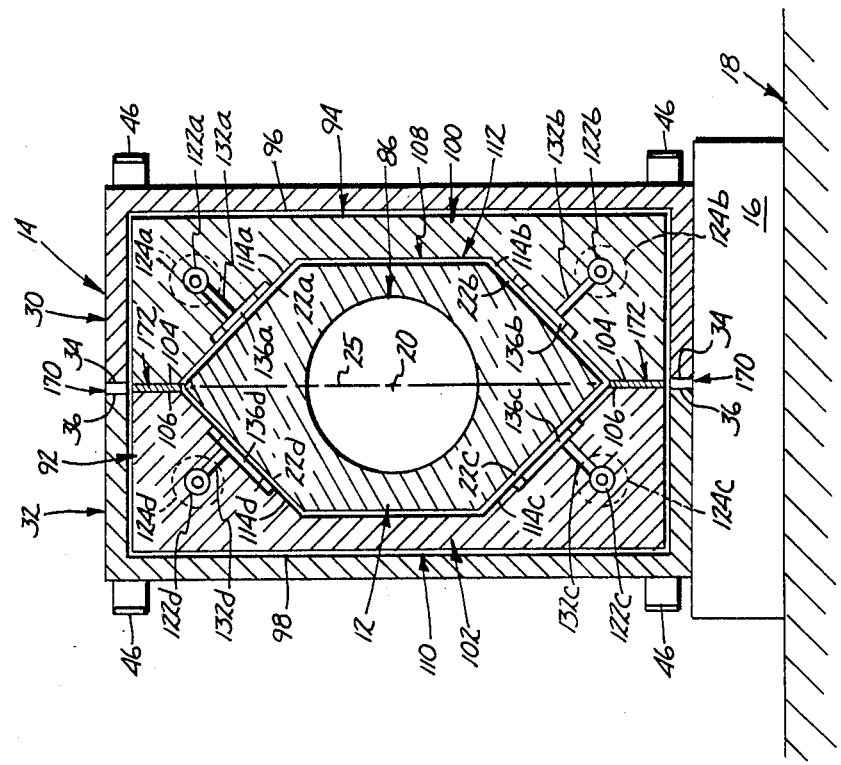
FIG. 5 is a sectional view as taken along lines 5—5 in FIG. 1.

A gas bearing slide assembly 10 for controlled linear motion is shown generally in FIGS. 1 and 2. The slide assembly 10 includes an elongated slide ram 12 which is movably mounted within a housing 14. The housing 14 is mounted upon a sub-base 16, which is typically mounted on a base 18 of granite or the like.

Figure 4:
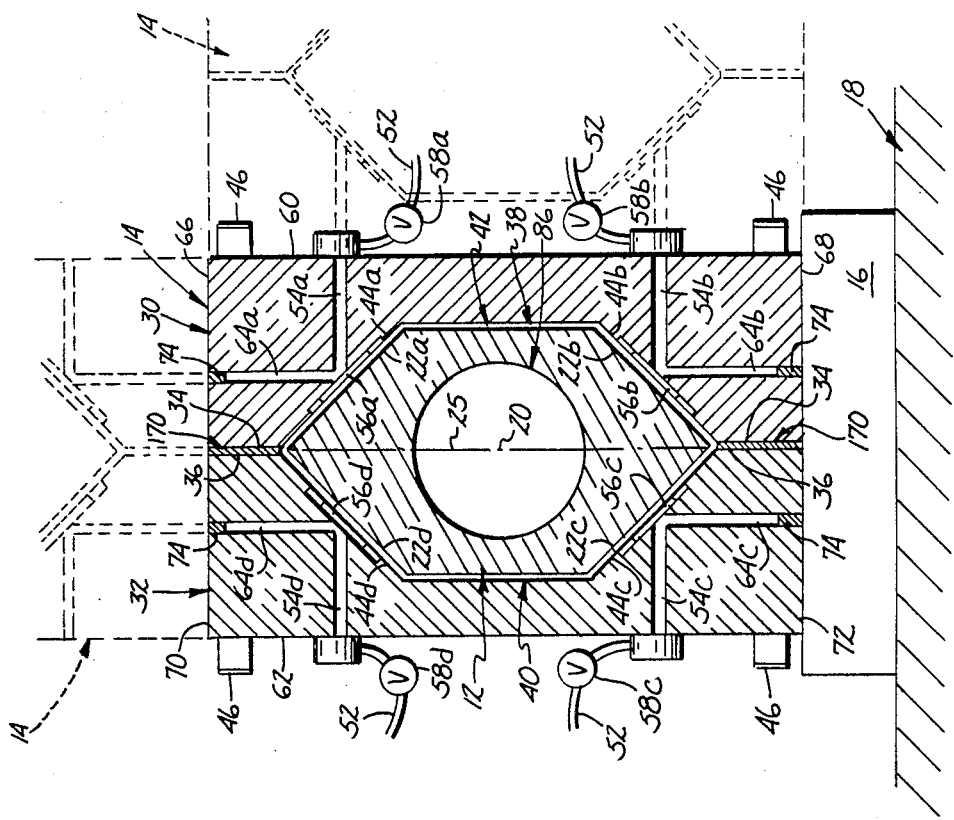
FIG. 4 is a sectional view as taken along lines 4—4 in FIG. 1.

The slide ram 12 and housing 14 are shown in greater detail in FIGS. 3 and 4. The slide ram is elongated along a longitudinal central axis 20. The slide ram 12 is preferably formed of tool steel. As seen in FIG. 4, the slide ram 12, in lateral cross section, has six exterior planar surfaces. Preferably, four of these surfaces are longitudinally extending, planar slide ram surfaces 22a, 22b, 22c and 22d, which are parallel to the central axis 20 of the slide ram 12 and integrally formed on the slide ram 12. The ram slide surfaces 22a–22d are symmetrically opposed about the central axis 20 of the ram slide 12, with the ram slide surfaces 22a and 22b being separated from the ram slide surfaces 22c and 22d by a central plane 25 extending through the central axis of the slide ram 12 (see FIG. 4). Preferably, in lateral cross-section opposed slide surfaces 22a and 22c are parallel, as are opposed slide surfaces 22b and 22d. In addition, slide surfaces 22a and 22c are preferably perpendicular to slide surfaces 22b and 22d.

As seen in FIG. 3, the housing 14 comprises a pair of substantially identical longitudinally extending housing halves—a first housing half 30 and a second housing half 32. The first housing half 30 has a planar joinder surface 34 which mates with a planar joinder surface 36 of the second housing half 32 when the housing halves are secured together to form the housing 14. The planar joinder surfaces 34 and 36 of the housing halves are on an inner side of each respective housing half. Extending longitudinally along the inner side of the first housing half 30 is a recess 38. Similarly, a recess 40 extends longitudinally along the inner side of the second housing half 32. The recesses 38 and 40 are shaped such that when the housing halves 30 and 32 are mounted together as shown in FIG. 4, a longitudinal throughbore 42 is defined through the housing 14. The slide ram 12 is adapted to be slidably received in the throughbore 42 of the housing 14. Longitudinally extending housing slide surfaces 44a, 44b, 44c and 44d define the throughbore 42, in lateral cross-section as seen in FIG. 4. Housing slide surfaces 44a and 44b in part define recess 38 of the first housing half 30, while housing half surfaces 44c and 44d in part define the recess 40 of the second housing half 42.

The longitudinal throughbore 42 also has a central longitudinal axis, which is colinear with the axis 20 of the slide ram 12 when the slide ram 12 is mounted in the throughbore 42. The housing slide surfaces 44a–44d are symmetrically opposed, in lateral cross-section, about the longitudinal axis 20, as illustrated in FIG. 4. The housing slide surfaces 44 are disposed in the same manner as the ram slide surfaces 22 with respect to the axis 20. Thus, ram slide surface 22a slidably mates with housing slide surface 44a, ram slide surface 22b slidably mates with housing slide surface 44b, ram slide surface 22c slidably mates with housing slide surface 44c and ram slide surface 22d slidably mates with housing slide surface 44d. The ram and housing slide surfaces are designed to permit longitudinal movement of this slide ram 12 with respect to the housing 14. The housing slide surfaces of each housing half are integrally formed thereon, and the housing halves are preferably formed of tool steel. The housing halves 30 and 32 are secured together by suitable fastening means, such as fastening bolts 46, and when so joined, the mated joinder surfaces 34 and 36 of the housing halves define a housing joinder plane which is generally coplanar with the central plane 25 and passes through the central axis 20.

A gas bearing is created between the ram and housing slide surfaces to separate said surfaces and support the slide ram 12 relative to the housing 14. Typically, the gas used is compressed air. As seen in FIG. 1, compressed air is provided from an air supply 50 through air lines 52 to the housing 14. Each housing slide surface 44a–44d is provided with one or more housing air inlets 54a–54d, respectively (see FIG. 4). A plurality of grooves or lands are provided on the face of the housing slide surface 44 which communicate with the air inlet 54 for that housing slide surface 44. FIG. 3 shows grooves or lands 56b for air inlet 54b on housing slide surface 44b, which are typical. Grooves 56a–56d are also partially shown in FIG. 4. A valve 58 can be provided for each air inlet 54. The grooves are designed to evenly distribute pressurized air across the face of the housing side surfaces so that a uniform air film is created between each of the mated ram and housing slide surfaces.

The air inlets 54a and 54b in the first housing half 30 extend from an outer side 60 of the first housing half 30 to their respective housing slide surfaces 44a and 44b (see FIG. 4). Similarly, the air inlets 54c and 54d in the second housing half 32 extend from an outer side 62 thereof to their respective housing slide surfaces 44c and 44d. Air inlets 64a and 64b are provided from a top side 66 and a bottom side 68 of the first housing half 30, respectively. Similarly, air inlets 64c and 64d are provided from a top side 70 and a bottom side 72 of the second housing half 32, respectively. In FIG. 4, plugs 74 are shown in the air inlets 64a–64d. Plugs 74 are removable, however, so that housings 14 can be stacked on top of one another or side-by-side as shown in phantom in FIG. 4. Adjoining air inlets 54 of side-by-side housings 14 are thus connectable as illustrated in phantom (the air inlets 54 are also plugable using plugs 74). This permits the use of a plurality of air slide assemblies 10 in close proximity to one another and facilitates the supplying of pressurized air to such slide assemblies 10.

Linear motion of the slide ram 12 with respect to the housing 14 along the axis 20 is controlled by suitable means, such as a linear stepper motor 80. The motor 80 is supported by motor mount bracket 82 and is operably connected to the slide ram 12 by a drive link 84. Actuation of the motor 80 (by typical control means, not shown) moves the drive link 84 in direction either right or left as viewed in FIGS. 1 and 2 parallel to the longitudinal central axis 20. Preferably, the drive link 84 extends co-axially with the central axis 20 to engage the slide ram 12. In a preferred embodiment, the slide ram 12 has an internal throughbore 86 which is concentric about the central axis 20, as seen in FIG. 4. The drive link 84 extends into the throughbore 86 from a first end 88 of the slide ram 12 and engages the slide ram 12 adjacent a second end 90 thereof, as shown in phantom in FIG. 1. This arrangement is desirable when the slide ram 12 is to be moved linearly so that its second end 90 is in a precise position. By securing the motor 80 to the slide ram 12 axially and proximate the second end 90 thereof, the potential for distortion and inaccuracy of position location of the slide ram 12 is minimized. Other drive means can be used to linearly move the slide ram 12 with respect to the housing 14, such as by a fluid or gas actuator. The slide assembly 10 of the present invention is usable for precision location use, so the linear driving means for the slide ram must be able to move the slide ram 12 in very small distance increments and with a minimum of error, vibration or distortion.

When the slide assembly 10 is used in horizontal or generally horizontal applications, the extension of the slide ram 12 from the housing 14 may cause an outer extended end of the slide ram 12 to droop relative to the desired central axis 20. To counteract this problem, the slide assembly 10 of the present invention is provided with counterbalance means. In a preferred embodiment, the counterbalance means comprises a counterbalance 92 which is slidably movably mounted on the slide ram 12. Many forms are contemplated for the counterbalance 92. For example, the counterbalance could be mounted within the internal throughbore of 86 of the slide ram 12 or mounted externally of the housing 14 on the slide ram 12. In the embodiment shown, the counterbalance 92 is mounted on the slide ram 12 within the housing 14. A counterbalance cavity 94 is provided within the housing 14, as seen in FIG. 5. The counterbalance cavity 94 is defined by recesses 96 and 98 in the first and second housing halves 30 and 32, respectively. The cavities 96 and 98 are deeper within the inner sides of the first and second housing halves 30 and 32 than the recesses 38 and 40, and separate each housing slide surface 44a-44d into two coplanar housing slide surface portions which are longitudinally spaced apart, as illustrated in FIG. 3.

The counterbalance 92 itself is preferably comprised of a pair of substantially identical longitudinally extending counterbalance halves—a first counterbalance half 100 and a second counterbalance half 102. Along an inner side of counterbalance half 100 is a planar joinder surface 104 which mates with a similar planar joinder surface 106 on an inner side of the second counterbalance half 102 when the counterbalance halves are secured together to form the counterbalance 92. Extending longitudinally along the inner side of the first counterbalance half 100 is a recess 108. Similarly, a recess 110 extends longitudinally along the inner side of the second counterbalance half 102. When the counterbalance halves 100 and 102 are joined generally along their planar joinder surfaces 104 and 106, the recesses 108 and 110 combine to form a counterbalance throughbore 112 extending longitudinally through the counterbalance 92.

The counterbalance 92 is adapted to be slidably mounted (via the counterbalance throughbore 112) on the slide ram 12. The counterbalance throughbore 112 also has a central longitudinal axis, which is colinear with the axis 20 of the slide ram 12 when the slide ram 12 is mounted in the counterbalance throughbore 112. The throughbore 112 is partially defined in lateral cross-section by a plurality of longitudinally extending counterbalance slide surfaces 114a, 114b, 114c and 114d. The counterbalance slide surfaces 114a-114d are symmetrically opposed about the central axis 20 when the slide ram 12 is mounted in the counterbalance throughbore 112. The counterbalance slide surfaces 114a-114d are adapted to slidably mate with the ram slide surfaces 22a-22d, respectively, as shown in FIG. 5. This permits longitudinal movement of the counterbalance 92 relative to the slide ram 12.

As stated, the counterbalance 92 is preferably mounted on the slide ram 12 and within the counterbalance cavity 94 of the housing 14. The counterbalance cavity 94 is thus of size sufficient to permit longitudinal movement of the counterbalance 92 relative to the housing 14.

The counterbalance slide surfaces of each counterbalance half are integrally formed thereon, and the counterbalance halves are preferably formed of tool steel or other relatively dense material with respect to the slide ram. The counterbalance halves 100 and 102 are secured together by suitable fastening means, such as bolts 116, and when so joined, the mated joinder surfaces 104 and 106 of the counterbalance halves define a counterbalance joinder plane which is generally coplanar with the central plane 25 and passes through the central axis 20.

The counterbalance 92 is supported on the slide ram 12 by air bearings which are created by thin films of compressed air between the mated counterbalance slide surfaces 114 and ram slide surfaces 22. Compressed air is supplied to the counterbalance 92 from air supply 50 via air lines 52. A valve 118 is provided to control the flow of air from air line 52 to a manifold 120. The manifold 120 directs compressed air into four counterbalance air inlet pipes 122a, 122b, 122c and 122d. Counterbalance air inlet pipes 122 rigidly connect the manifold 120 to the counterbalance 92 within the housing 14. As illustrated in FIGS. 3 and 5, the housing 14 has longitudinal bores 124a-124d for acceptance of each counterbalance air inlet pipe 122a-122d, respectively (bores 124a and 124b in first housing half 30 and bores 124c and 124d in second housing half 32). As shown in FIGS. 1 and 2, the manifold 120 has a central bore 126 to permit the drive link 84 of the motor 80 to pass freely therethrough. Each counterbalance air inlet pipe 122a-122d feeds a counterbalance air inlet 132a-132d, respectively, formed in the counterbalance halves 100 and 102. Each counterbalance air inlet 132 extends to its respective counterbalance slide surface 114. A plurality of grooves or lands 136 are provided on each respective counterbalance slide surface 114 to evenly distribute the pressurized air provided thereto and create a uniform air film between each of the mated ram and counterbalance slide surfaces. Pressurized air which is forced into the housing 14 through the housing air inlets 54a-54d or counterbalance air inlets 132a-132d escapes from the housing 14 through the ends of the throughbore 42 or out between the housing halves 30 land 32.

Counterbalance drive means are provided to move the counterbalance 92 relative to the slide ram 12, and specifically to move the counterbalance 92 in direction opposite to the direction of longitudinal movement of the slide ram 12. The counterbalance 92 is moved responsive to movement of the slide ram 12. One means for achieving such movement is illustrated in FIGS. 1 and 2 by counterbalance drive assembly 140. The counterbalance drive assembly 140 includes a slide ram follower link 142 which has a first end 144 secured to the first end 88 of the slide ram 12. In the embodiment shown, the follower link 142 is shaped to extend longitudinally around the motor 80 and its motor mount 82. A first gear rack 146 is secured to the follower link 144 adjacent a second end 148 thereof. The first gear rack 146 and follower link 142 are rigid components so that when the slide ram 12 is moved longitudinally, the follower link 142 and first gear rack 146 move with it an equal distance.

An idler gear 150 is rotatably mounted on a lateral axis in a gear mounting block 152, which is supported on the base 18 (see FIGS. 1 and 2). As shown, the idler gear 150 includes a first gear 154 with teeth engaging the first gear rack 146, and a second gear 156 with teeth engaging a second gear rack 158. The first and second gears 156 and 158 are secured together for couple rotation so that when first gear rack 146 moves in a first direction (such as left as viewed in FIGS. 1 and 2), the idler gear 150 causes the second gear rack 158 to move in a second opposite direction (to the right as viewed in FIGS. 1 and 2). The relative ratios of the first and second gears determine the extent of inverse linear movement of the second gear rack 158 with respect to the first gear rack 146.

A gear rack follower link 160 is secured at a first end 162 thereof to the second gear rack 158. A second end 164 of the gear rack follower link 160 is secured to the manifold 120 for the counterbalance 92. The gear rack follower link 160 is formed to extend longitudinally around the motor 80 and its motor mount 82 from the second gear rack 158 to the manifold 120. To that end, the gear rack follower link 160 has a first leg 166 and a second leg 168 both of which are secured to the manifold 120 at first ends thereof. Adjacent their second ends, the legs 166 and 168 converge to define the first end 162 of the gear rack follower link 160. The second gear rack 158 and gear rack rollower link 160 are rigid components so that movement of the second gear rack 158 in response to movement of the first gear rack 146 causes movement of the manifold 120. Support bearings 169 are provided on the motor mount 82 to support intermediate portions of the first and second follower links 142 and 160.

The manifold 120, as previously described, is rigidly connected to the counterbalance 92 by means of the counterbalance air inlet pipes 122a–122d. Movement of the slide ram 12 in a first longitudinal direction along the central axis 20 therefore causes movement of the counterbalance 92 in a second opposite longitudinal direction by operation of the counterbalance drive assembly 140. The extent of responsive movement of the counterbalance 92 in direction opposite to the direction of longitudinal movement of the slide ram 12 is a function of both the extent of movement of the slide ram 12 and the relative masses of the slide ram 12 and counterbalance 92. Such inverse longitudinal movement can be on a one-to-one ratio, or on some other ratio. In addition, other suitable means for achieving inverse longitudinal movement of the counterbalance 92 with respect to the slide rim 12 are also contemplated.

It is quite important in the fabrication of the slide rim 12 and housing halves 30 and 32 that the mating slide surfaces of these components be perfectly and precisely aligned. The components can be roughly formed to a relatively good tolerance separately, but to achieve the final mated raltionship between each specific ram slide surface 22 and its respective housing slide surface 44 equalized lapping is used. In this process, the ram slide surfaces 22a and 22b are aligned upon the housing slide surfaces 44a and 44b on the first housing half 30 and the slide ram 12 and first housing half 30 are moved longitudinally with respect to one another to mutually improve the slide surfaces as they slide together. A suitable abrasive (such as lapping compound) is used between the slide surfaces to achieve the desired mated precision between such surfaces in the equalizing lapping process. The slide ram and first housing half 30 are lapped together in this manner until the central plane 25 of the slide ram 12 and the planar face 34 of the first housing half 30 are generally co-planar. This process is repeated with respect to the ram slide surfaces 22c and 22d and the housing slide surfaces 44c and 44d on the second housing half 32.

When formed in this manner, assembly of the first and second housing halves 30 and 32 together along their planar joinder surfaces 34 and 36 (with the slide ram 12 in the throughbore 42 therebetween) leaves no tolerance or room for the slide ram 12 to move with respect to the housing 14. To create a necessary tolerance to permit slidable longitudinal movement of the slide rim with respect to the housing 14, spacer shims 70 are aligned between the facing planar joinder surfaces 34 and 36 of the first and second housing halves 30 and 32. Such spacer shims 170 permit the varying of the size of the throughbore 42 in direction perpendicular to the housing joinder plane. The spacer shims 170 thus provide sufficient clearance to permit slidable longitudinal movement of the slide ram 12 with respect to the housing 14. This clearance is still quite small, preferably being 0.00002 inches between each mated pair of slide surfaces 22 and 44. Such a clearance is sufficient, however, to permit relative axial movement when pressurized gas is introduced between the mated slide surfaces at 80–100 psi.

For different applications of the slide assembly 10, spacer shims 170 of different thicknesses may be desired. For example, when the slide assembly 10 is used to achieve precise position location through movement of the slide ram 12 (to within 0.000005 inch per inch of slide ram travel), a spacer shim 170 of 0.0002 inches thickness are desired. For less precise applications, spacer shims 170 of greater thickness can be used. When spacer shims of greater thickness are used, each mated pair of slide surfaces is spaced further apart and the air flow therebetween is increased, thus making the slide assembly less sensitive to containments (debris) on the precision slide surfaces. If the slide surfaces are somehow damaged they can be relapped together to achieve better precision mating of said services.

In the embodiement of the counterbalance which is shown in the figures (wherein the counterbalance is movably mounted about the slide ram 12), a similar fabrication scheme is used for mating the counterbalance slide surfaces 114 and ram slide surfaces 112. The counterbalance halves 100 and 102 are mated together by equalizing lapping. The counterbalance slide surfaces 114a and 114b on the first counterbalance half 100 are equalized lapped to the ram slide surfaces 22a and 22b until the central plane 25 of the slide ram 12 and the planar joinder surface 104 of the first counterbalance half 100 are generally coplanar. Similarly, the counterbalance slide surfaces 114c and 114d on the second counterbalance half 102 are equalized lapped to the ram slide surfaces 22c and 22d until the central plane 25 of the slide ram 12 and the planar joinder surface 106 of the second counterbalance half 102 are generally coplanar. Spacer shims 172 are provided between the planar joinder surfaces 104 and 106 of the counterbalance halves 100 and 102 to attain a desired clearance between the mated slide surfaces 22 and 114 in the same manner as the housing halves are spaced. The spacer shims 170 and 172 are preferably formed from the nickel and a sufficient number of shims are provided between the mating planar joinder surfaces of the housing halves and the counterbalance halves to achieve a uniform, substantially parallel spacing between those surfaces.

The slide assembly 10 of the present invention provides an air bearing linear slide wherein the slide ram 12 is supported on air bearings within the housing 14 and can be moved to a precise location along its longitudinal central axis 20 without drooping or distortion. The unique construction of slide ram 12 and housing 14 of the present invention permits the efficient attainment of precise mating of mutually sliding surfaces of the slide ram and housing 14. When the slide assembly 10 is used in an application where drooping of the slide ram 12 away from the central axis 20 is not a problem (such as when the central axis 20 is aligned vertically), counterbalance means may not be required. Precise precision location is still achieved, however, to an extent not possible with prior air bearing linear slides because the precisely mated sliding surfaces are symmetrically opposed about the central axis 20 of the slide ram 12. The potential for error is minimized in any particular direction laterally away from the axis 20, because the symmetrically opposed mated slide surfaces act against one another to compensate for such variances. The unique configuration, in lateral cross-section, of the slide ram 12 and housing 14 also provide the slide ram 12 with rotational stability and additional beam strength and stiffness. The relaively narrow design, in lateral cross-section, of the slide ram 12 (narrow in terms of shorter distances between opposed parallel mated slide surfaces—e.g., the distance between ram slide surface 22a and ram slide surface 22c) also allows for more precision in terms of slide ram movement and locational functions than prior air bearing linear slides.

There is no need in the present invention to feed compressed air to the slide ram, which is the major moving component of the slide assembly. In prior air bearing linear slides wherein saddles were used, compressed air was fed to the air bearing surfaces through the saddle component, which was the linearly moving component. In the present invention, compressed air is fed to the stationary housing. This reduces the necessary attachments to the slide ram and thus reduces the chance for linear movement bias because of the need to follow movement of the slide ram with compressed air feed lines.

The hydrostatic bearing created between each pair of ram and housing slide surfaces suspends the slide ram 12 between the housing slide surfaces 44a–44d in predetermined spaced relationships thereto. While a mechanical counterbalance 92 is shown and described herein, a counterbalance effect can also be obtained by varying the relative air pressure between longitudinally spaced portions of each housing slide surface 44. For example, in FIG. 1, separate valves 58 are shown for each of the housing air inlets on the outer side 62 of the second housing half 32. To compensate for drooping of the slide ram 12 as it is extended away from the housing 14 (to the right as viewed in FIG. 1) the air pressure is increased for those air inlets fed by valves 58a' and 58b" relative to the air inlets fed by valves 58b' and 58a". A similar pressure relationship would be achieved by manipulation of the valves (not shown) on the first housing half 30 for the housing air inlets 54a and 54b. Such a change in relative air pressure acting on the slide ram forces the ram to return to alignment along the desired axis. The valves 58 in this arrangement are manipulated as a function of the extent of linear extension of the slide ram 12 with respect to the housing 14.

The slide assembly 10 of the present invention is designed to specifically achieve precise precision location of the second end 90 of the slide ram 12. Such a function may be desired when a position probe is secured on the slide ram 12, or when a work piece is secured upon the slide ram 12 and it is desired to move the work piece to a precise location with respect to a remote tool or probe. Other applications for the slide assembly 10 are also contemplated, such as supporting a table for moving work pieces or tools relative to one another.

Although the present invention has been described with reference to preferred embodiments, workers skilled in the art will recognize that changes may be made in form and detail without departing from the spirit and scope of the invention.

What is claimed is:

1. A gas bearing slide assembly for controlled linear motion, the gas bearing slide assembly comprising:

housing means having a throughbore extending therethrough along a first longitudinal axis, said throughbore being partially defined by a plurality of opposed planar and longitudinally extending housing slide surfaces in the housing means;

an elongated slide ram adapted to be slidably received in the throughbore of the housing means, the slide ram having its exterior partially defined by a plurality of planar ram slide surfaces which are adapted to slidably mate with the housing slide surfaces and permit longitudinal movement of the slide ram relative to the housing means along the first longitudinal axis;

means for supplying pressurized gas between the slide surfaces of the housing means and slide ram and creating a hydrostatic bearing to separate said slidably mating surfaces under fluid pressure and support the slide ram for movement with respect to the housing means;

means for moving the slide ram longitudinally with respect to the housing means;

counterbalance means longitudinally movably mounted on the slide ram for limiting lateral movement of the slide ram relative to the first longitudinal axis; and means for moving the counterbalance means responsive to movement of the slide ram in direction opposite to the direction of longitudinal movement of the slide ram.

2. The gas bearing slide assembly of claim 1 wherein the throughbore in the housing and the slide ram have a common central longitudinally extending axis which is coaxial with the first longitudinal axis, and wherein the slidably mating surfaces of the housing means and slide ram are symmetrically disposed in lateral cross-section about the central axis.

3. The gas bearing slide assembly of claim 1 wherein each housing slide surface is defined by two longitudinally spaced, parallel housing slide surface portions, with a cavity being defined in the housing means between each longitudinally spaced pair of housing slide surface portions.

4. The gas bearing slide assembly of claim 3 wherein the counterbalance means is mounted on the slide ram to move relative thereto within the cavity of the housing means.

5. The gas bearing slide assembly of claim 1 wherein the means for moving the slide ram is operably connected to the slide ram along the first longitudinal axis.

6. The gas bearing slide assembly of claim 1 wherein the first longitudinal axis extends centrally through the throughbore in the housing means, and wherein the housing slide surfaces are symmetrtically opposed, in lateral cross-section, about the first longitudinal axis.

7. The gas bearing slide assembly of claim 1 wherein the extent of responsive movement of the counterbalance means in direction opposite to the direction of longitudinal movement of the slide ram is a function of the extent of movement of the slide ram.

8. The gas bearing slide assembly of claim 1 wherein the extent of responsive movement of the counterbalance means in direction opposite to the direction of longitudinal movement of the slide ram is a function of the relative masses of the slide ram and counterbalance means.

9. A gas bearing slide assembly for controlled linear motion, the gas bearing slide assembly comprising:
  housing means having a throughbore extending therethrough along a first longitudinal axis, said throughbore being partially defined by a plurality of opposed planar and longitudinally extending housing slide surfaces in the housing means;
  an elongated slide ram adapted to be slidably received in the throughbore of the housing means, the slide ram having its exterior partially defined by a plurality of planar ram slide surfaces which are adapted to slidably mate with the housing slide surfaces and permit longitudinal movement of the slide ram relative to the housing means;
  means for supplying pressurized gas between the slide surfaces of the housing means and slide ram and creating a hydrostatic bearing to separate said slidably mating surfaces under fluid pressure and support the slide ram for movement with respect to the housing means;
  means for moving the slide ram longitudinally with respect to the housing means;
  counterbalance means longitudinally movably mounted on the slide ram; and
  the counterbalance means having a counterbalance throughbore extending therethrough along the first longitudinal axis, said throughbore being partially defined by a plurality of opposed planar and longitudinally extending counterbalance slide surfaces in the counterbalance means, the counterbalance slide surfaces being adapted to slidably mate with the ram slide surfaces and permit longitudinal movement of the counterbalance means relative to the slide ram;
  means for supplying pressurized gas between the slide surfaces of the counterbalance and slide ram and creating a hydrostatic bearing to separate said slidably mating surfaces under fluid pressure and support the counterbalance means for movement with respect to the slide ram; and
  means for moving the counterbalance means in direction opposite to the direction of longitudinal movement of the slide ram.

10. The gas bearing slide assembly of claim 9 wherein the counterbalance means comprises:
  a pair of longitudinally extending counterbalance halves, each counterbalance half having at least two of the opposed planar and longitudinally extending counterbalance slide surfaces thereon.

11. The gas bearing slide assembly of claim 10, and further comprising:
  a plurality of spacer shims secured between the counterbalance halves when the counterbalance halves are combined to form the counterbalance means.

12. The gas bearing slide assembly of claim 9 wherein the counterbalance means comprises:
  a pair of substantially identical longitudinally extending counterbalance halves, each counterbalance half having a planar joinder surface which mates with a planar joinder surface of the other counterbalance half when the counterbalance halves are secured together to form the counterbalance means.

13. The gas bearing slide assembly of claim 12 wherein the mated planar joinder surfaces of the counterbalance halves define a counterbalance joinder plane which passes through the first longitudinal axis.

14. The gas bearing slide assembly of claim 13, and further comprising:
  a plurality of shims secured between the mated joinder surfaces of the counterbalance halves.

15. The gas bearing slide assembly of claim 1 wherein the housing means comprises:
  a pair of longitudinally extending housing halves, each housing half having at least two of the opposed planar and longitudinally extending housing slide surfaces thereon.

16. The gas bearing slide assembly of claim 15 wherein each housing slide surface is defined by two longitudinally spaced, parallel housing slide surface portions.

17. The gas bearing slide assembly of claim 15 and further comprising:
  a plurality of spacer shims secured between the housing halves when the housing halves are combined to form the housing means.

18. A gas bearing slide assembly for controlled linear motion, the gas bearing slide assembly comprising:
  housing means having a throughbore extending therethrough along a first longitudinal axis, said throughbore being partially defined by a plurality of opposed planar and longitudinally extending housing slide surfaces in the housing means and the housing means being defined by a pair of substantially identical longitudinally extending housing halves, each housing half having a planar joiner surface which mates with a planar joinder surface of the other housing half when the housing halves are secured together to form the housing means;
  an elongated slide ram adapted to be slidably received in the throughbore of the housing means, the slide ram having its exterior partially defined by a plurality of planar ram slide surfaces which are adapted to slidably mate with the housing slide surfaces and permit longitudinal movement of the slide ram relative to the housing means;

means for supplying pressurized gas between the slide surfaces of the housing means and slide ram and creating a hydrostatic bering to separate said slidably mating surfaces under fluid pressure and support the slide ram for movement with respect to the housing means;

means for moving the slide ram longitudinally with respect to the housing means;

counterbalance means longitudinally movably mounted on the slide ram; and means for moving the counterbalance means in direction opposite to the direction of longitudinal movement of the slide ram.

19. The gas bearing slide assembly of claim 18 wherein the mated planar joinder surfaces of the housing halves define a housing joinder plane which passes through the first longitudinal axis.

20. The gas bearing slide assembly of claim 19, and further comprising:

a plurality of shims secured between the mated joinder surfaces of the housing halves.

* * * * *

UNITED STATES PATENT AND TRADEMARK OFFICE
CERTIFICATE OF CORRECTION

PATENT NO. : 4,606,587

DATED : August 19, 1986

INVENTOR(S) : Vern C. Thompson

It is certified that error appears in the above-identified patent and that said Letters Patent is hereby corrected as shown below:

In column 11, line 19, the word "symmetrtically" should read --symmetrically--.

In column 13, line 5, the word "bering" should read --bearing--.

Signed and Sealed this

Eleventh Day of November, 1986

Attest:

DONALD J. QUIGG

Attesting Officer

Commissioner of Patents and Trademarks